United States Patent [19]

Holland

[11] Patent Number: 4,546,730

[45] Date of Patent: Oct. 15, 1985

[54] TANGLE-FREE PET HITCH AND FEEDING STATION

[76] Inventor: John D. Holland, Rte. 1, Scottsville, Ky. 42164

[21] Appl. No.: 650,138

[22] Filed: Sep. 13, 1984

[51] Int. Cl.⁴ ............................................. A01K 1/04
[52] U.S. Cl. .................................. 119/117; 119/51 R
[58] Field of Search ...................... 119/117, 51.5, 51 R

[56] References Cited

U.S. PATENT DOCUMENTS

| | | | |
|---|---|---|---|
| 601,952 | 4/1898 | Day | 119/117 |
| 2,191,811 | 2/1940 | Trampier, Sr. | 119/51.5 |
| 2,981,230 | 4/1961 | Putnam | 119/117 |
| 3,286,962 | 11/1966 | Warth | 119/51 R X |

Primary Examiner—Hugh R. Chamblee
Attorney, Agent, or Firm—Richard L. Caslin

[57] ABSTRACT

A circular dog-run and feeding station is provided with a shade so that the animal is free to exercise within a complete circle. There is a feeding bowl provided with a vertical bearing receiving an elongated stake that is driven into the ground where the bowl stabilizes the stake. An elongated pole is pivotally mounted to the stake above the bowl and a free end of the pole engages the ground. This free end of the pole is fitted with a flexible leash that is no longer in length than the pivoted pole. The free end of the leash is attached to the collar of the dog. An umbrella is mounted at the lower end of its vertical shaft to the upper end of the stake.

4 Claims, 3 Drawing Figures

TANGLE-FREE PET HITCH AND FEEDING STATION

BACKGROUND OF THE INVENTION

1. Field of the Invention

This invention relates to the art of animal tethers for attachment in the ground, and particularly to such tethers which are tangle-free and which are furnished with both a feeding and a watering bowl that cannot be overturned.

2. Description of the Prior Art

The Putnam U.S. Pat. No. 2,981,230 describes a tangle-free pet hitch which has a stake that is driven into the ground and which permits the tethered animal to have a full circular area for exercise. There is a vertical post that is driven into the ground, and it has a stabilizing member of cruciform configuration to prevent the post from being pulled loose. Near the top of the post is a fixed collar, and it supports a sleeve member that is rotatably and slidably mounted relative to the post and to the collor member. A rigid arm is welded to the sleeve. The collar has a series of radially spaced holes for receiving a pair of stop bolts which are adjustably mounted which cooperate with an abutment on the collar to limit the rotary movement of the sleeve. The animal is fitted with a collar and chain that is attached to the free end of the rigid arm so that the animal is restricted so that it cannot run completely around the post because of the lost-motion stop means provided for limiting the rotary movement of the sleeve. There is no provision in this Putnam patent for providing the animal with water or feed.

The Davis U.S. Pat. No. 2,720,862 is not related to a tangle-free pet hitch. It describes a portable trough and shelter for use by cattle. There is shown a pedestal-like base, an upright supporting column, and a large, dome-shaped awning or shade formed of aluminum or the like. The base is weighted in such fashion that the shelter rights itself automatically even when tipped over. A removable spike is provided at the bottom of the base, and it is adapted to be thrust into the ground to help prevent the shelter from being tipped over.

The Moore U.S. Pat. No. 3,205,860 describes a stock feeder comprising a lightweight, plastic feeding tub which is assembled on a raised foundation. This tub is provided with recesses that receive and rest on a supporting frame. When an opened-end 55 gallon drum is secured on top of the tub, enough feed can be put in the drums to last a typical group of stock for about a week. The feed flows smoothly and automatically from the drum into the feeding receptacles. In one modification, an umbrella or other shelter is provided to shade the animals. No provision is made for tethering an animal to this feeding trough.

The Warner U.S. Pat. No. 3,330,257 describes a livestock feeder for use in the open range which is provided with means for facilitating relocation of the feeder. The feeder is formed by use of an automobile tire which has been turned inside out and results in a deep-welled feed receptacle when fastened on a platform. There is also an umbrella-like canopy mounted on a central post which is supported from the raised platform. This feeder is not provided with an animal hitch.

The Farrar U.S. Pat. No. 354,404 describes a tether for a cow, where there is a post that is driven into the ground. On top of this post is a spring casing formed by two halves. A tether pole is joined to the spring casing, and it is engaged by the coil spring. A tethering rope is joined to the free end of the tether-pole; however, the rope is longer than the pole so that the rope could become entangled around the post.

The Warth U.S. Pat. No. 3,286,962 shows a dog umbrella having a central shaft that is provided at the bottom with a helical, tapered member that is to be driven into the ground. Side rings are provided for securing a dog chain to the shaft. This is not a tangle-free design.

OBJECTS OF THE PRESENT INVENTION

The principal object of the present invention is to provide a complete circular dog-run and feeding station with a tether that includes an elongated pivoted pole in combination with a flexible leash where the leash is no longer than the length of the pole.

A further object of the present invention is to provide a circular dog-run of the class described with a feeding bowl in combination with an elongated stake that is to be driven into the ground where the presence of a bowl stabilizes the stake and retards the stake from being loosened.

A still further object of the present invention is to provide a circular dog-run of the class described with the addition of an umbrella to provide shade as well as protect the feeding bowl from the elements.

SUMMARY OF THE INVENTION

The present invention provides a complete circular dog-run and feeding station comprising a feeding bowl with a vertical bearing receiving an elongated stake that is driven into the ground where the bowl serves to stabilize the stake and the stake serves to prevent the bowl from overturning. An elongated pole is pivoted at one end of the stake above the pole while the other end of the pole rests on the ground. The ground end of the pole is fitted with a flexible leash which is no longer in length than the pivoted pole. The free end of this leash is fastened to the collar of the dog.

BRIEF DESCRIPTION OF THE DRAWINGS

This invention will be better understood from the following description taken in conjunction with the accompanying drawings, and its scope will be pointed out in the appended claims.

DESCRIPTION OF THE PREFERRED EMBODIMENTS

Figure 1:
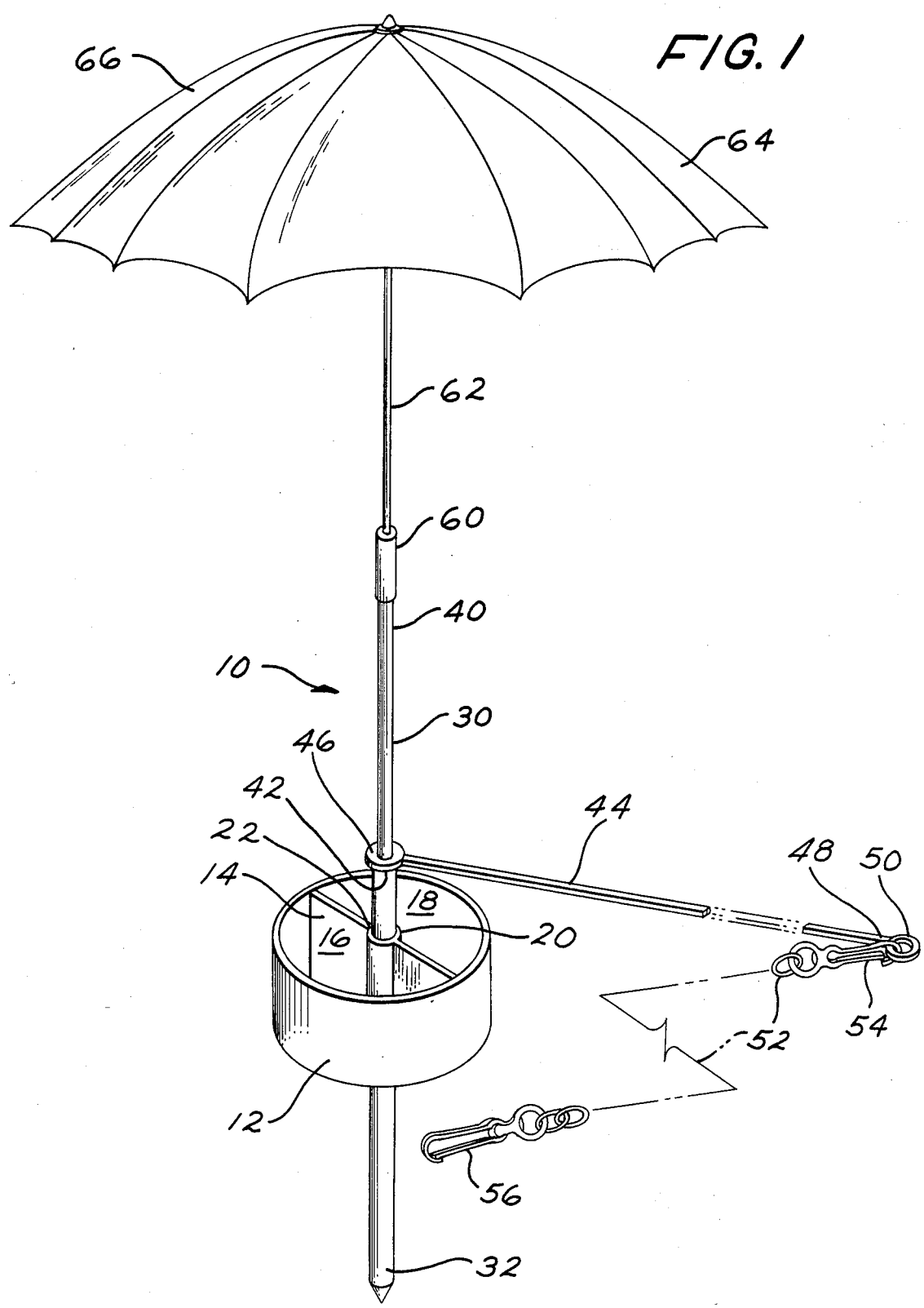
FIG. 1 is a front perspective view of a circular dog-run and feeding station assembly embodying the present invention.

Turning now to a consideration of the drawings, and in particular, to the front perspective view of FIG. 1 there is shown a complete circular dog-run and feeding station assembly 10 of the present invention. There is a dog bowl 12 that is provided with a central vertical partition 14 that divides the bowl into separate compartments 16 and 18, where one can be supplied with dog food while the other would include drinking water. Some people may prefer the bowl having only water and that food be supplied from a separate bowl only at mealtime. Also it is conceivable that some people may prefer more than two separate compartments depending on the preference of the owner.

Figure 2:
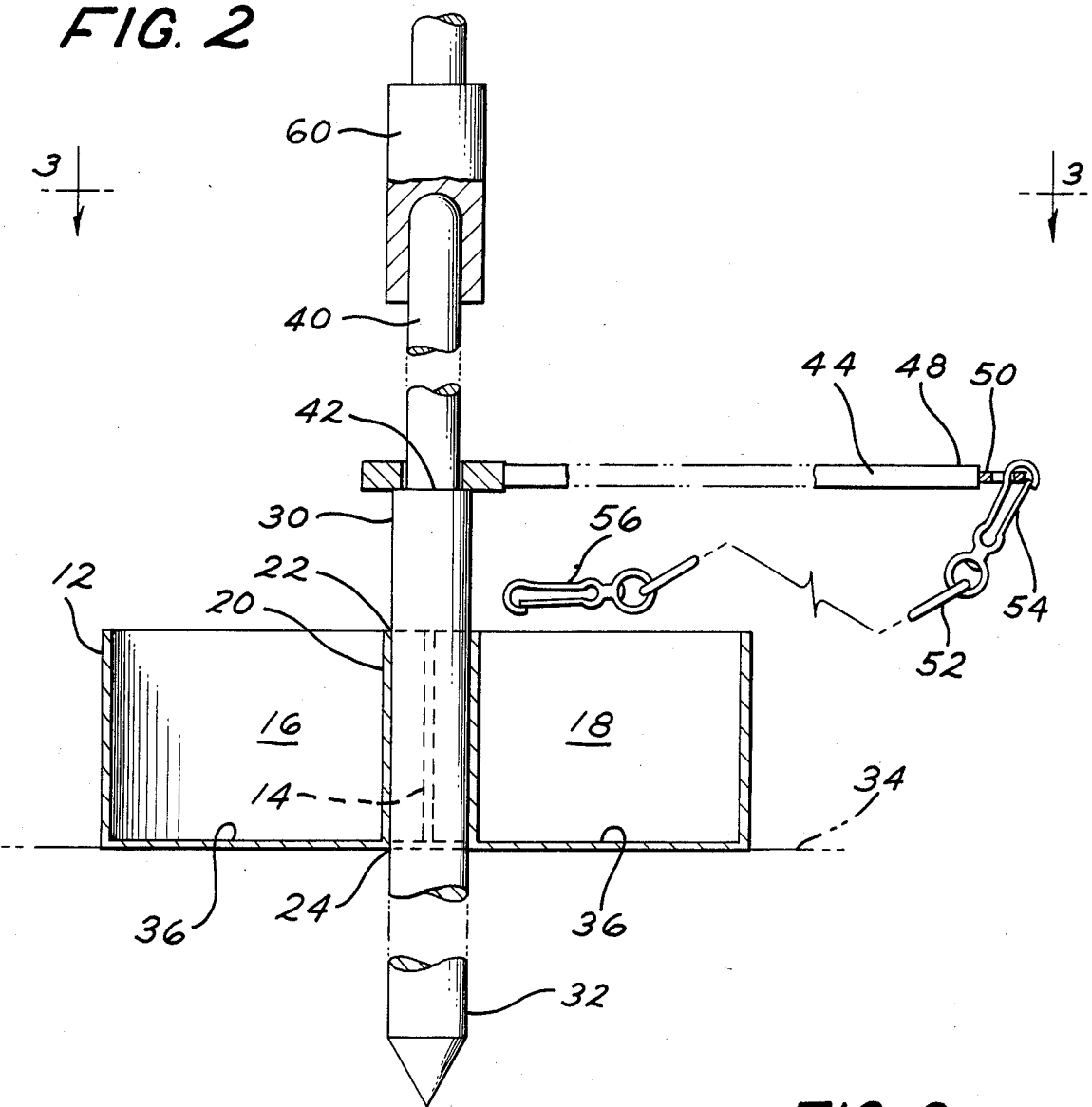
FIG. 2 is a fragmentary cross-sectional elevational view showing the lower half of the assembly on a larger scale to illustrate the details of construction.

This central partition 14 of the bowl 12 has a vertical bearing 20 which is also generally centrally located on the partition. This vertical bearing extends completely through the bowl as is clear from FIG. 2 which shows the bearing open both at the top end 22 and at the bottom end 24. This vertical central bearing 20 is designed to receive an elongated stake 30 which is able to slide through the bearing 20 and to have a close fitting relationship, as is clear from FIG. 2. The lower half 32 of the stake extends below the bowl 12 and is driven into the ground 34 to serve as an anchoring means, while the bowl 12 serves as a stabilizing means for the stake by retarding the stake from being tilted at an angle from the vertical. This is one reason why it is well that the vertical bearing 20 be generally at or near the center of the partition 14 so that the bowl can function best as a stabilizing means. The two compartments 16 and 18 of the bowl 12 are closed at the bottom by a bottom wall 36 so that each compartment may retain dog food or drinking water (not shown) for the convenience of the dog while left unattended for long periods of time.

Figure 3:
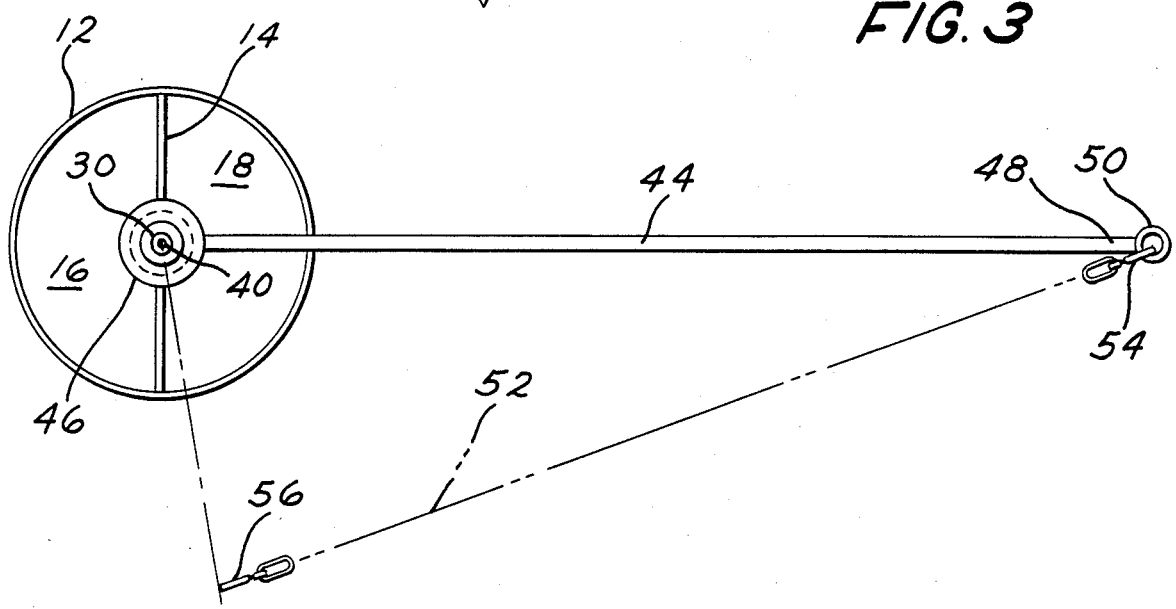
FIG. 3 is a cross-sectional plan view on a smaller scale taken on the line 3—3 of FIG. 2.

The upper half 40 of the stake 30 extends generally above the top portion of the bowl 12. A supporting collar 42 is positioned on the upper half 40 of the stake adjacent the top of the bowl 12, as is seen in both FIGS. 1 and 2. This supporting collar 42 cooperates with an elongated rigid pole 44, which is fitted at one end with a loop member 46 that is seated on the supporting collar 42 and is able to pivot with respect thereto about a complete circle, as is clear from FIG. 1. The other end of the elongated pole 44 is the free end 48, and it is also provided with a loop member 50. This free end 48 of the elongated pole 44 rests on the ground 34 so that no great strain is placed on the first loop member 46 in trying to suspend this pole 44 in mid-air, which is unnecessary. A flexible dog chain or leash 52 is attached to the free end 48 of the pole 44 by means of a snap fastener 54 at one end of the chain, while the other end of the chain has a similar snap fastener 56 for attachment to the collar (not shown) of the dog. Notice in FIG. 3 that this dog chain or leash 52 is no longer than the length of the elongated pole 44 so that it is possible for the dog to have access to the dog food and water in the compartments 16 and 18 while being free of danger from the chain 52 becoming tangled with respect to the stake 30. Thus the dog has a complete circular dog-run where the circle has a radius equal to the length of the elongated pole 44 plus the length of the dog chain or leash 52.

Many people own dogs, and yet they cannot afford to have a fenced-in yard. Most dogs enjoy being outside, especially in the spring and summer of the year. The present invention provides an inexpensive means for allowing the dog to stay outside without running away and getting lost, while at the same time having water and food available. Some people use a dog-run of a wire strung between two posts or trees. Others chain their dogs to a dog house, but they have very little room to move and exercise. Most dogs like to run and get exercise, and the present invention allows this to happen without the dog becoming entangled by the chain.

The upper end of the upper half 40 of the stake 30 is provided with a coupler 60 for use in mating engagement with the lower end of the shaft or handle 62 of an umbrella 64 that is mounted vertically from the stake 30 so as to cast a shadow or shade for the dog as well as to protect the food and drinking water from the elements. This umbrella 64 has a collapsible shade 66, but this shade could be made rigid without departing from the scope of the present invention. Having described above the present invention of an animal tether and feeding station assembly, it will readily be apparent to those skilled in this art that the dog is able to exercise whenever it is ready. The dog may obtain water and food when desired. The dog is secure from running away, and yet it has a rather large amount of freedom of action, as well as protection from the weather.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A small animal tether and feeding station assembly comprising:
    a. a water and feed bowl having a vertical partition dividing the bowl into separate compartments, the said partition having a vertical through bearing positioned adjacent the center thereof; and
    b. an elongated stake adapted to slide through the said through bearing in a close fit, the lower half of the stake being adapted to be driven into the ground beneath the bowl, while the upper half of the stake forms a vertical shaft; and
    c. an umbrella having an elongated shaft supporting a collapsible shade, and coupling means joining the lower end of the umbrella shaft to the upper end of the stake;
    d. the upper part of the stake having a supporting collar located closely adjacent the top of the bowl, and an elongated pole fitted at one end with a ring member that slips loosely over the top end of the stake and is pivotally supported on the said supporting collar, the other end of the elongated pole being adapted to rest upon the ground and fitted with a fixed length of flexible leash that is slightly shorter than the elongated pivoted pole for use in attachment at its other end to the collar of a small pet.

2. The invention as is recited in claim 1 wherein the lower half of the said stake that is to be drive into the ground serves both as an anchor means for the elongated pivoted pole as well as a stabilizing means for the feeding bowl so that the bowl cannot be overturned, and the bowl in turn also stabilizes the holding power of the stake.

3. A complete circular dog-run and feeding station assembly comprising:
    a. a bowl having a vertical partition supporting a vertical through bearing adjacent the center thereof;
    b. an elongated stake adapted to slide through the bearing witha close fit, the lower half of the stake being adapted to be driven into the ground as an anchor means, while the bowl serves to stabilize the stake from being tilted with respect to the ground holding the stake;
    c. the stake having a supporting collar located closely above the bowl, and an elongated pole fitted at one end with a loop member that is threaded onto the stake and rests upon the supporting collar and is capable of pivoting completely around the stake in either direction, the other end of the pivoted pole being the free end that is adapted to rest upon the ground, said free end being fitted with a flexible leash that is of a fixed length no longer than the length of the elongated pivoted pole, the leash being adapted to be attached to a collar means of a dog installed in this circular dog-run.

4. A complete circular dog-run and feeding station assembly invention as recited in claim 3 wherein the upper half of the said stake has an upper end fitted with a first coupling means, and a shade means fitted with a second coupling means for joining with the first coupling means to provide a shelter and shade for a dog installed in this dog-run.

* * * * *